US009898788B1

(12) United States Patent
Calargun et al.

(10) Patent No.: US 9,898,788 B1
(45) Date of Patent: Feb. 20, 2018

(54) PREDICTIVE RESTAURANT ORDERING

(71) Applicant: Amazon Technologies, Inc., Seattle, WA (US)

(72) Inventors: Canku Alp Calargun, Redmond, WA (US); Gustavo Eduardo Lopez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 14/668,593

(22) Filed: Mar. 25, 2015

(51) Int. Cl.
*G06Q 50/12* (2012.01)
*G06Q 30/06* (2012.01)
*G06N 99/00* (2010.01)
*G06N 5/04* (2006.01)
*G06Q 30/00* (2012.01)

(52) U.S. Cl.
CPC .............. *G06Q 50/12* (2013.01); *G06N 5/04* (2013.01); *G06N 99/005* (2013.01); *G06Q 30/0635* (2013.01)

(58) Field of Classification Search
USPC ............................................. 705/15
See application file for complete search history.

(56) References Cited

U.S. PATENT DOCUMENTS

| 2014/0006182 A1* | 1/2014 | Wilson | G06Q 50/12 |
| | | | 705/15 |
| 2015/0332374 A1* | 11/2015 | Fano | G06Q 10/087 |
| | | | 705/14.66 |

* cited by examiner

*Primary Examiner* — Garcia Ade
(74) *Attorney, Agent, or Firm* — Lee & Hayes, PLLC

(57) ABSTRACT

A meal ordering service is configured to receive takeout and delivery orders from customers and to place the orders with selected restaurants. Past information regarding a customer is collected and analyzed to create a predictive model of the customer's meal ordering habits. On any given day, the predictive model may be used, in light of the current and scheduled status of the customer, to predict a time of day that the customer may want to receive a meal and to also determine a restaurant from which the customer may want to receive the meal. The meal ordering service may be configured to automatically order a meal for the customer from the determined restaurant so that the meal arrives at or before the predicted time of day.

17 Claims, 4 Drawing Sheets

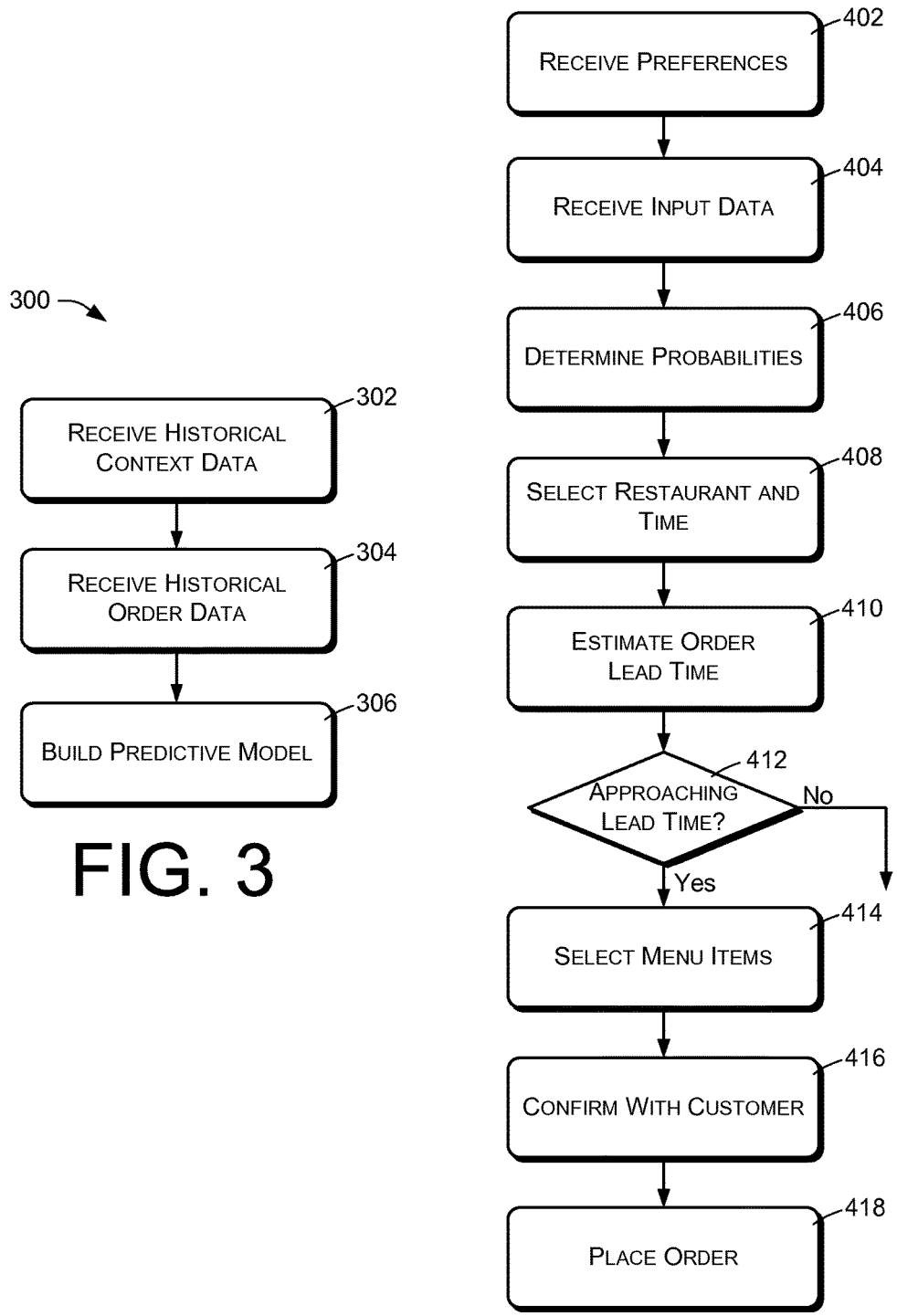

PREDICTIVE RESTAURANT ORDERING

BACKGROUND

Restaurants often provide meal takeout and delivery services. A customer may call a restaurant or use a device such as a computer or smartphone to order a meal. If the customer orders the meal for takeout, the customer visits the restaurant to pick up the meal. If the customer orders the meal for delivery, the restaurant delivers the meal to the location of the customer.

One issue with food takeout and delivery services is the time lag in delivering or fulfilling a meal order. People tend to place their orders when they become hungry, but the meals may not arrive until quite some time later.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a flow diagram illustrating an example method of constructing a predictive model for predicting times and restaurants for predictive meal orders.

FIG. 4 is a flow diagram illustrating an example method of predictively placing a meal order for a customer.

DETAILED DESCRIPTION

Figure 1:
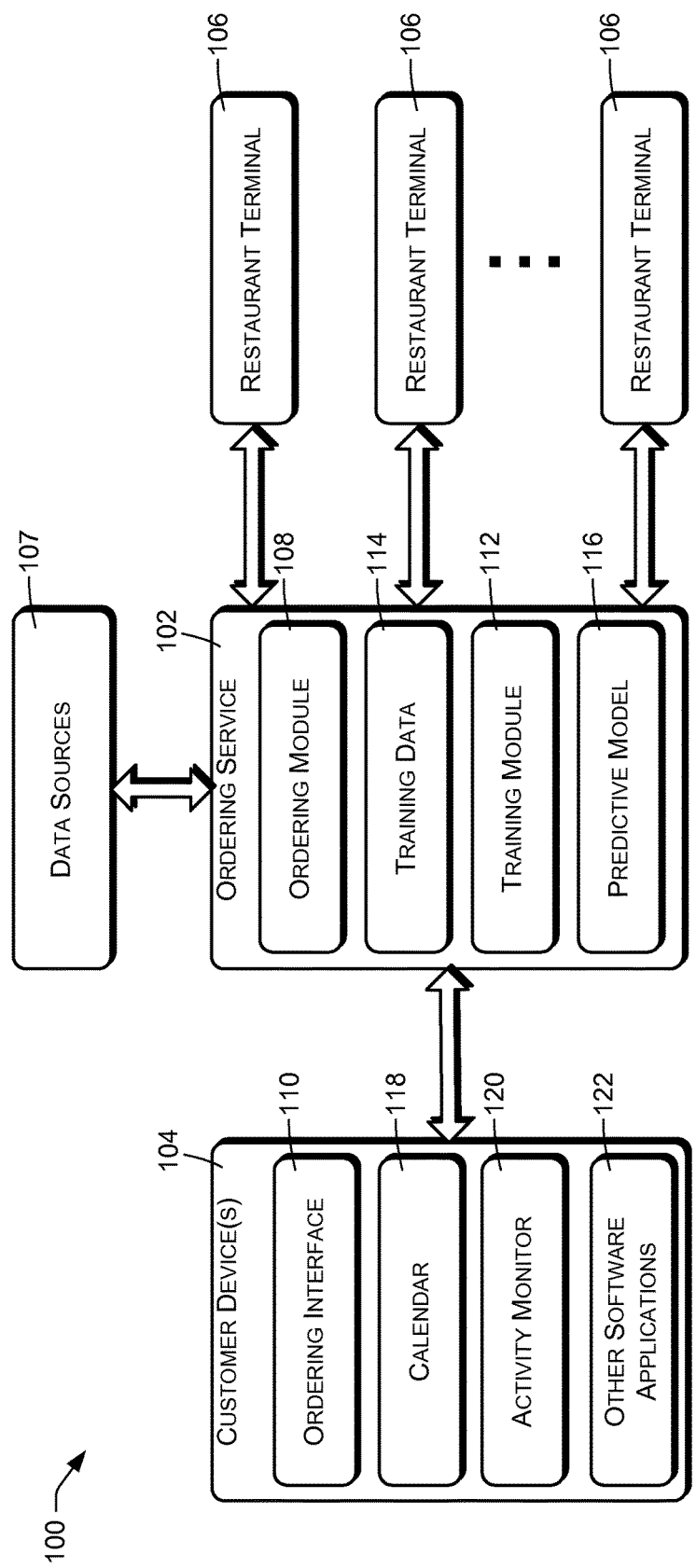
FIG. 1 is a block diagram depicting an illustrative operating environment having an automated restaurant ordering system that predictively places orders for customers.

Described herein is a system for providing anticipatory meal takeout and delivery services. The system implements a meal ordering service that allows a customer to orders meals with a device such as a computer, smartphone, tablet computer, speech-based assistant, etc. An order placed by a customer is relayed to a selected restaurant for fulfillment. The system may be configured to handle financial aspects of the order by charging the customer and by providing reimbursement to the restaurant.

In addition to allowing customers to manually place meal orders with restaurants and other food services, the system is able to automatically place meal orders on behalf of customers, in anticipation of the customers' desires. The orders may be placed ahead of the times at which the customers will want to eat so that the meals are delivered at or before those times.

In order to determine when to place orders for customers, the system gathers historical context data and historical menu item ordering data regarding orders of multiple customers over time. Historical context data may include past statuses of customers, such as times during which customers are in meetings, times during which customer are travelling, locations of customers, and similar information. Context data may also include information that may affect the customers' behaviors, such as weather and traffic conditions.

Context data may be received from personal electronic devices associated with customers, such as from customers' smartphones or other mobile devices. For example, a customer's smartphone may be configured to periodically report the location of the customer. As another example, a smartphone may provide information relating to the calendar of a customer so that the system can determine when the customer is in a meeting or is otherwise engaged. Personal electronic devices may include any electronic device that can be associated with a user, and may include various types of mobile devices, fitness trackers, smartwatches and other wearable devices, personal digital assistants, media players, personal computers, tablet computers, and so forth.

Specific examples of information that may be indicated by context data with respect to a single customer include:
- calendar information of the customer;
- weather information;
- traffic information;
- busy/free status of the customer;
- exercise performed by the customer;
- caloric intake of the customer; and
- information generated by a personal electronic device of the customer.

Menu item ordering data may include past times at which customers placed online orders or at which orders were predictively placed on behalf of the customers, the food items of the orders, the costs of the orders, the restaurants with which the orders were placed, whether the orders were for take-out or delivery, the delivery times of the orders, and so forth.

The historical context data and historical menu item ordering data are used to train a predictive model that is used in conjunction with customer-specific data to predict the probability of a customer ordering a meal from any given restaurant at any future time. Based on the predictive model and the customer-specific data, the system anticipatorily determines a time of day at which the customer will likely want to receive a meal and also determines the restaurant from which the customer is likely to want to receive the meal. The system then automatically places a meal order on behalf of the customer. In some cases, the customer may be notified and given the opportunity to confirm, cancel, or modify the order.

In addition to determining the time and restaurant for an automatic meal order, historical menu item ordering data may be used to select the menu items for each order. Also, historical order and delivery times may be analyzed to estimate an order lead time, and each order may be placed at a time such that the meal arrives when the customer is most likely to want to receive the meal. In some cases, the context data and historical menu item ordering data may be analyzed to predict whether place the order for delivery or take-out.

Using the system described herein, meal orders may be placed to account for current and scheduled statuses and activities of a customer. For example, current context data obtained from a smartphone of the customer may indicate that the customer is exercising. Past behavior may indicate that the customer typically wants to eat after exercising at this particular time of day. As another example, data obtained from an electronic calendar of the customer may indicate that the customer has a meeting scheduled at a certain time, and this information may be used to predict that the customer will want to eat prior to, during, or after the meeting. After determining when the customer wants to eat, the system also determines which restaurant to order from and the time of day at which the order should be placed so that it will arrive at the time desired by the customer. The system then places the order at the determined time of day.

FIG. 1 illustrates relevant components of a system 100 for facilitating automated meal and menu item orders for customers. The system 100 comprises an automated restaurant or food ordering system or service 102, a customer device 104, and restaurant terminals 106 at each of multiple restaurants. The system 100 may receive context data, menu item ordering data, and other data from one or more data sources 107. Such data sources may comprise websites, online services, various types of customer-related devices and systems, etc.

Note the term restaurant as used herein is intended to encompass any type of food service, including services that offer sit-down dining, delivery-only services, and takeout-only services, and including fast-food establishments, bars, diners, food trucks, delis, and so forth. Furthermore, the terms "food" and "menu item" are intended to encompass drinks and beverages such as soft drinks, beer, wine, etc.

The ordering service 102 may comprise an online, network-accessible service that provides ordering services for many different customers and for many different restaurants. Each customer may have an associated customer device 104, which may comprise a general-purpose computer, a smartphone, a laptop computer, a speech interface device, a gesture recognition device, or other device through which the customer may provide instructions to the ordering service 102. Each restaurant may have an associated terminal 106 through which the restaurant may receive orders. The restaurant terminal 106 may comprise a point-of-sale device, a general-purpose computer, a smartphone, a laptop computer, or other device capable of conveying order information to a restaurant. In some cases, the function of the restaurant terminal 106 may be served by a facsimile machine (fax machine) or even by a telephone through which the ordering service 102 places orders using voice instructions.

Communications between the ordering service 102, the customer devices 104 and the restaurant terminals 106 may be through a public wide-area-network (WAN) such as the Internet, which may utilize various different technologies including wired and wireless technologies. For example, the customer device 104 may utilize WiFi® or cellular data technologies for communications with the Internet and hence the ordering service 102. Similarly, the restaurant terminals 106 may utilize any of various types of communications and/or networking technologies to communicate with the ordering service 102.

The ordering service 102 has an ordering module 108 that accepts orders from customers and that places orders with restaurants. In some cases, as will be described in more detail in the following discussion, the ordering module 108 may also automatically place orders for individual customers based on predictions of customer needs or desires. The ordering module 108 may comprise software that runs on one or more servers of the ordering service 102.

In some embodiments, the ordering module 108 may implement or may be responsive to a customer interface such as a website that interacts with customers to accept meal orders. A website is a collection of related web pages that are accessible through an Internet domain or uniform resource locator (URL). The website may be accessible from the customer device 104 and may present graphical information to the customer that describes different available restaurants that are near the customer. The website may allow the customer to select a restaurant, to select menu items from the restaurant, to place a meal order containing menu items, to pay for the order, and to specify a delivery address for the order. The website may also allow the customer to rate or review received orders and to record or confirm delivery times of orders.

The customer may interact with the ordering module 108 through an ordering interface 110 on the customer device 104. In some cases the ordering interface 110 may comprise an Internet browser that is used to access the website of the ordering service 102. In other cases, the ordering interface 110 may comprise a dedicated or special-purpose software application that is installed on the customer device 104 and that presents a graphical customer interface on a display of the customer device 104 for selecting restaurants, selecting menu items, placing and paying for orders, and so forth. Such a software application may communicate with the ordering module 108 of the ordering service 102 to obtain information regarding restaurants and to place orders for the customer.

The ordering service 102 may maintain an account for each customer indicating customer preferences, billing information, historical ordering information, authentication information, etc.

In addition to allowing a customer to manually order meals through the ordering interface 110 and/or the ordering module 108, the ordering service 102 supports automatic, anticipatory meal ordering. The anticipatory meal ordering is based on an analysis of past ordering behavior of the customer in light of current and historical context information regarding the customer and/or other customers. More specifically, the anticipatory meal ordering is based on a predictive model that evaluates the probability of the customer ordering a meal from any particular restaurant at any particular future time.

The ordering service 102 has a training module 112 that uses training data 114 to build a predictive model 116. The training data 114 comprises information describing past behavior, statuses, activities, ordering details, and other information regarding multiple orders and multiple customers over time.

Some of the training data 114 may be received from the customer devices 104. For example, a customer device 104 may have a calendar application 118 that lists meetings and other appointments of the customer. Similarly, the customer device 104 may have a fitness/activity monitor or application 120 that monitors physical activity of the customer. The customer device 104 may have other applications 122 that have access to other information regarding the customer over time. The other applications, for example, may include a diet application that tracks food and calorie intake of a user. The calendar application 118, the fitness/activity monitor 120, and the other applications 122 may be configured to report information about the customer to the ordering service 102 to create the training data 114.

The training data 114 may also be received from the other data sources 107, such as websites with which customers interact. For example, the training data may include past eating habits of customers based on fitness or weight loss websites that record customer data. As another example, the training data may include data from online social networks such as location "check-ins" by customers that are recorded by such social networks. As further examples, the data sources may comprise websites or online services from which general context information is obtained, such as weather and traffic information, food delivery service status, customer preferences, past customer orders, customer preferences, the current time of day, and so on.

The data sources 107 may also provide training data 114 regarding different types of online activities, such as past purchases of various items by multiple customers and demographic information regarding multiple customers. For example, the ordering service 102 may be part of a larger infrastructure that provides different types of services such as online sales of various items. Past purchases by customers of different items, such as books, music, equipment, etc., may at times be relevant to the customers' preferences regarding meals and restaurants. For example, previous purchases of cookbooks specializing in vegetarian dishes may indicate a preference by a customer for vegetarian meals and restaurants. As another example, previous online purchases of food ingredients may indicate a preference for certain types of ethnic cuisines.

Based on the training data 114, the training module 112 uses machine learning techniques to create a predictive model 116 that predicts the relative likelihood of a particular customer wanting to order from a particular restaurant at a particular time, based on historical and current context data of the customer and historical menu item ordering data regarding the customer. Based on the predictive model 116, customer-specific context data, and menu item ordering data, the ordering module periodically determines the a probability for each of multiple time-of-day and restaurant combinations, selects the combination having the highest probability, and places a meal order to arrive from the selected restaurant at the selected time of day.

Figure 2:
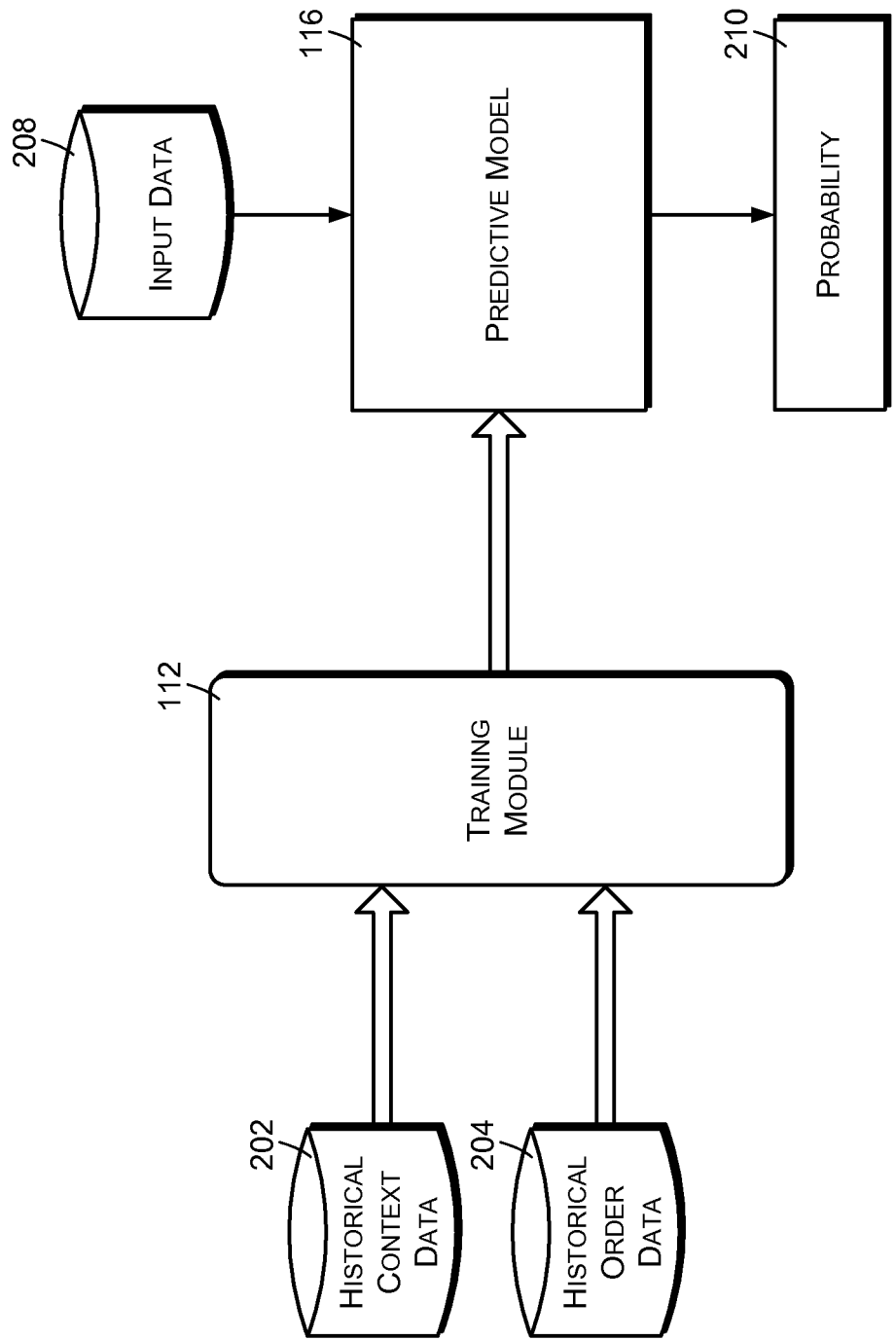
FIG. 2 is a block diagram illustrating the construction and usage of a predictive model for predicting times and restaurants for predictive meal orders.

FIG. 2 illustrates further details regarding creation and use of the predictive model 116 to determine times and restaurants for anticipatory customer orders. Generally, a predictive model such as this is constructed based on an aggregate set of historical feature values. For example, the historical feature values may be based on a broad customer population, and may include data relating to orders from many different restaurants. Once the predictive model is constructed, a limited and more specific set of input feature values is evaluated by the predictive model. The input feature values may relate, for example, to a particular customer or to a limited set of customers having common demographic characteristics. Similarly, the input feature values may relate to a specific restaurant, to specific type of restaurant, or to restaurants within a common geographic area.

Conceptually, the predictive model works by assigning a weight to each of the input feature values, where the weights are determined by the training module 112 based on the aggregate set of historical feature values. The weighted input feature values are then combined to produce a probability indicating the likelihood that the input feature values correspond to a particular condition. In this case, the input feature values relate to a specific customer and a specific restaurant, and the model predicts the likelihood of the customer placing an order at the restaurant at a given time of day.

In the example described herein, the historical feature values used in constructing the predictive model 116 comprise historical context data 202 and historical order data 204. The historical context data 202 may comprise information relating to customers at different times in the past. For example, the historical context data 202 may indicate statuses of the customers, such as past locations and activities of the customers at different times. The historical context data 202 may also include past environmental information relating to the customers such as weather and traffic conditions at different times.

Customer statuses may include various different activities. For example, a customer status may comprise "in a meeting," "busy," or "free," as indicated by an electronic calendar of the customer. Status may include activities such as eating, exercising, watching television, traveling, driving, walking, working, sleeping, talking, and any other characteristic of a customer and his or her current activity. Past activities may include such things meetings, exercise workouts, meals, drives, exercising, etc.

The historical context data 202 may be obtained on an ongoing basis from different devices associated with customers, such as computers, smartphones, personal digital assistants, smartwatches, gaming devices, voice interface assistants, home security systems, entertainment systems, exercise equipment, transportation equipment, and any other network-connected devices that are capable of providing information relating to the status and preferences of the customer. As one example, a customer's calendar application 118 may be used to provide status information regarding vacations, meetings and other types of appointments or engagements. More generally, any of various electronic devices or services associated with the customer may be used to determine or derive customer status. As further examples:

a home security system may be monitored to determine whether the customer is at his or her home and to determine whether other people are also with the customer;

an activity tracker or diet/fitness application on a customer's smartphone may be queried to determine physical activities and physical activity levels of the customer;

a nutrition or diet/fitness application installed on the customer's smartphone may be queried to determine eating habits of the customer, including preferred cuisines and typical caloric intake;

activities performed by the customer on different electronic devices may be monitored to determine the location of the customer at different times;

a travel application stored on the customer's smartphone may be queried to determine travel-related activities of the customer;

a navigation application on the customer's smartphone may be queried to determine locations and destinations of the customer;

online services and websites associated with the customer and with the customer applications may be queried to obtain information regarding the customer, including the application-related information described above.

Historical context data 202 may also be gathered from data sources 107 such as websites, services, and applications that a customer uses apart from their mobile device. For example, certain services may maintain calendars for users, and may provide information regarding the status or activity of a customer at any given time. Similarly, online services may provide information relating to exercise, diet, nutrition, travel, traffic, weather, purchasing activities, and so forth regarding any particular customer.

The historical order data 204 indicates details regarding past meal orders of customers, including meal orders placed using the ordering interface 110 of the customer device 104. The historical order data 204 may indicate the times of past meal orders, the restaurants with which the meal orders were placed, the menu items included in the meal orders, the charges for the meal orders, the times at which the meal orders were delivered, whether the orders were for take-out or delivery, nutritional information regarding the meal orders, etc. The historical order data 204 may also include customer ratings of received meals and/or of different restaurants that supplied the meals.

The training module 112 analyzes the historical context data 202 and the historical order data 204 to create the predictive model 116. Various types of machine learning, also referred to as predictive analysis or predictive modeling, may be used to create the predictive model 116. For example, a process of logistic regression may be used to create the predictive model.

Once the predictive model 116 has been constructed based on aggregate data regarding a general population of customers and restaurants, specific input data 208 is used as input to the predictive model 116 to produce a probability 210 indicating the likelihood that the customer will want to receive a meal at a particular time from a particular restaurant. The input data 208 may include historical context data and historical ordering data as described above, except that in this case the data relates to the particular customer and restaurant under consideration. For example, the input data 208 may indicate the time of a particular meal order by the customer, the restaurant from which the meal was ordered, and context information corresponding to times preceding the time of the meal order. The context information may also include current context information, such as the recent, current, or scheduled statuses of the customer, which may include locations and activities of the customer. The input data 208 may also include recent, current, or forecast environmental information relating to the customer such as weather and traffic conditions in the vicinity of the customer.

The input data 208 may also indicate customer preferences. For example, the customer may use the ordering interface 110 or a web page of the ordering service 102 to specify preferences relating to restaurants, preferred cuisines, desired nutritional values for meals, desired calorie content of meals, desired prices of meals, whether the customer prefers take-out or delivery, and so forth. The predictive model 116 may be constructed to account for the customer preferences.

The predictive model 116 may be constructed to adapt to differing types and amounts of information that may be available for any particular customer. When there is a relatively long history of specific data regarding a customer, the model 116 may rely heavily on user-specific input data. When there is little or no historical data regarding the customer, the model 116 may be configured to rely on historical data corresponding to a group of other customers having similar demographic characteristics such as age, location, profession, and so forth. In cases where the demographic information of the customer is unknown, the model 116 may be configured to rely on historical data relating to a general population of customers.

FIG. 3 illustrates an example method 300 of constructing a predictive model. Although FIG. 3 shows actions in a particular order, certain of the actions may be performed in different sequential orders in various embodiments.

An action 302 comprises obtaining and receiving aggregate historical context data regarding many orders, by many customers, from many restaurants. The aggregate historical context data may indicate information regarding past statuses of the customers, which may include past locations and past activities of the customers at different times. The aggregate historical context data may be collected over time based on information received from software applications, devices, and systems with which the customers interact. For example, aggregate historical context data may be received from various types of software applications that are installed on personal devices of the customers such as the customers' smartphones, tablet computers, or other mobile devices. Similarly, the historical context data may be received from various devices and systems such as general-purpose computers, smartphones, tablet computers, media player devices, automated or computerized home equipment, personal assistant devices including voice-based assistants, in-home entertainment systems, audio and video communication devices and systems, computer software, websites, web services, customer interfaces, point-of-sale systems, security systems, surveillance systems, network-based cameras, navigation devices etc. Information from these sources may indicate statuses of customers such as the customers' locations or activities at particular times. The information may be collected over time to indicate a history of customer statuses.

The historical context data may also indicate historical environmental information that may have been relevant to the customers and/or to the customers' likelihood of wanting a meal at any given time in the past. Such environmental information may include weather information, which may have influenced whether a customer walked outdoors or for longer distances to pick up a food order. Environmental information may similarly include historical traffic information that may have influenced whether a customer drove to pick up a take-out meal order.

An action 304 comprises receiving historical menu item ordering data regarding many orders, by many customers, and from many restaurants. The historical menu item ordering data indicates past times at which customers ordered meals from each of multiple restaurants and/or times at which orders were anticipatorily placed for customers at particular restaurants. As a customer places or receives orders through the ordering service 102, the ordering service 102 records the information about the orders. The recorded information may include the ordering and delivery times of past meal orders, the restaurants with which the meal orders were placed, the menu items included in the meal orders, the costs of or charges for the ordered meals, nutritional information regarding each ordered meal, customer ratings or reviews of the meal orders, etc. The recorded meal orders may comprise orders that were placed manually by the customer as well as meals that were placed automatically by the ordering service 102 in anticipation of the customer's desires. Note that in some implementations, as will be described below, a customer may have the opportunity to approve or modify anticipatory orders before they are placed, thereby signaling his or her preferences over time.

An action 306 comprises building a predictive model based on the historical context data and the historical menu item ordering data, wherein the predictive model is responsive to customer-specific and restaurant-specific input data to predict a probability of the customer ordering a meal from a particular restaurant at any particular future time. The predictive model is generated from and based upon an aggregate set of data describing the experiences of a broad population of customers. The aggregate data may describe experiences of customers in different geographic locations and having different demographic characteristics. The aggregate data may also describe orders from many different restaurants.

FIG. 4 illustrates an example method 400 of anticipatorily placing meal orders for a customer. Although the example method 400 is described in the context of a single customer, the method will typically be performed for multiple customers to provide anticipatory ordering services for the multiple customers. Although FIG. 4 shows actions in a particular order, certain of the actions may be performed in different sequential orders in various embodiments.

An action 402 comprises receiving customer preferences. The customer may indicate preferences by accessing a component of the ordering service 102 such as a website of the ordering service or a software application that is installed on the customer device 104 and associated with the ordering service 102. Customer preferences may include cuisine preferences, dietary restrictions, food allergies, time-of-day preferences, desired price ranges, desired calorie content, desired nutritional content, preferred degree of variety/randomness in menu items or restaurants, whether a beverage is desired with each meal, and any other information that may be useful in customizing meal orders for each customer.

An action 404 comprises obtaining and receiving input data regarding the customer, which may indicate one or more current locations or activities of the customer. For example, the received input data may indicate that the customer is in a meeting, has been in a meeting, or scheduled to soon be in a meeting. More generally, the input data may indicate current and past activities and locations as well as activities and locations that are scheduled for the current day. The input data may also indicate environmental information that may affect the customer such as current weather conditions in the vicinity of the customer, current traffic conditions in the vicinity of the customer, and current traffic conditions in the areas of different restaurants. The input data may also include information regarding past orders by the customer, such as the times of past orders and the restaurants with which the orders were placed.

Actions 406 and 408 comprise using the predictive model with the input data to determine a future time at which the customer will want to receive a future meal, and to determine a restaurant from which the customer will want to receive the future meal. More specifically the action 406 comprises determining probabilities for different times and different restaurants, wherein each probability indicates the relative likelihood that the customer will want to receive a meal from a particular restaurant at a particular time. The action 406 may be performed using the predictive model that was built in the action 306, based on the received input data. The action 406 may be performed for different times of an immediately following time period during which it may be desirable to place orders for the customer. For example, the time period might extend from the present time to a future time, so that the time period is greater than the greatest possible delivery time of any of the restaurants under consideration. Furthermore, the action 406 may be performed for a set of restaurants that are in the vicinity of the customer and/or that offer delivery services to the current or projected location of the customer.

The action 408, which is performed after calculating probabilities for various times during the upcoming day, comprises determining a specific future time at which the customer will want to receive a future meal, and to determine a specific restaurant from which the customer will want to receive the future meal. The action 408 may comprise selecting the time/restaurant combination, among the combinations for which probabilities were calculated in the action 406, that has the highest relative probability as indicated by the probability model.

An action 410 comprises estimating an order lead time for the selected restaurant, based on historical ordering data regarding deliveries by the selected restaurant. In some cases, the action 410 may comprise determining historical lead times for deliveries by the selected restaurant to the actual location of the customer. A lead time in this context is the time from when an order is placed to the time at which the order is delivered. In other cases, the action 410 may comprise determining historical lead times for deliveries by the selected restaurant to locations near the location of the customer. The estimated lead time indicates the amount of time prior to a desired delivery time that an order should be placed to achieve delivery by the desired delivery time.

An action 412 comprises determining whether the current time is approaching the time at which the order should be placed, accounting for the estimated lead time, to ensure that the order will be delivered by the desired delivery time. For example, the action 412 may comprise determining whether the current time is within a threshold time of the desired delivery time minus the estimated lead time. If not, no further action is performed. Otherwise, if the current time is within a threshold time of the desired delivery time minus the estimated lead time, an action 414 is performed.

The action 414 comprises determining menu items for an order to be placed anticipatorily on behalf of the customer, which may be based at least in part on the historical menu item ordering data. The action 414 may be performed by examining customer preferences and past orders for the customer from the selected restaurant and from other restaurants. In addition, the action 414 may consider ratings provided by the customer for past meals from the selected restaurant. In some cases, customer preferences may indicate specific meals that may be considered as desirable options from each of the available restaurants, and the action 414 may select menu items based on such preferences. Preferences may also specify desired cuisines and other information that may guide in menu item selection.

An action 416, which may be performed in some implementations, comprises confirming an upcoming anticipatory order with the customer. The action 416 may comprise prompting the customer using the ordering interface 110 of the customer device 104. For example, the action 416 may comprise providing a notification on the customer device 104. In some cases, the action 416 may be limited to providing such a notification, and the customer may not need to affirmatively authorize the order. In other cases, the customer device 104 may prompt the customer to expressly authorize the order before placing the order. For example, the customer device 104 may ask the customer to affirmatively confirm or cancel the order, and the ordering service 102 may place the order only if it is confirmed by the customer.

In some cases, prior to placing the order, the customer may be queried to cancel or modify the order. For example, the customer may be queried by a pop-up notification on the screen of their smartphone. If the customer does not respond, the ordering service 102 may place the order automatically. If the customer responds by indicating that the ordering service 102 should cancel the order, the order is cancelled. If the customer responds by indicating modifications to the order, the ordering interface may present different options available to the customer, such as presenting a menu indicating currently selected items which may be changed by the customer.

An action 418, which is performed if the customer confirms the order, modifies the order, or fails to cancel the order, comprises placing the order with the selected restaurant. This may involve transmitting the order to the restaurant terminal 106 and displaying the order. The action 418 is performed at a time that is prior to the desired delivery time of the meal by at least the estimated lead time. In some cases, it may be possible to specify a specific delivery time for delivery of the meal. In other cases, a restaurant may respond to an order by delivering the meal as soon as possible.

The example method 400 may be performed periodically throughout a day for multiple customers, so that orders are placed at appropriate times.

Figure 5:
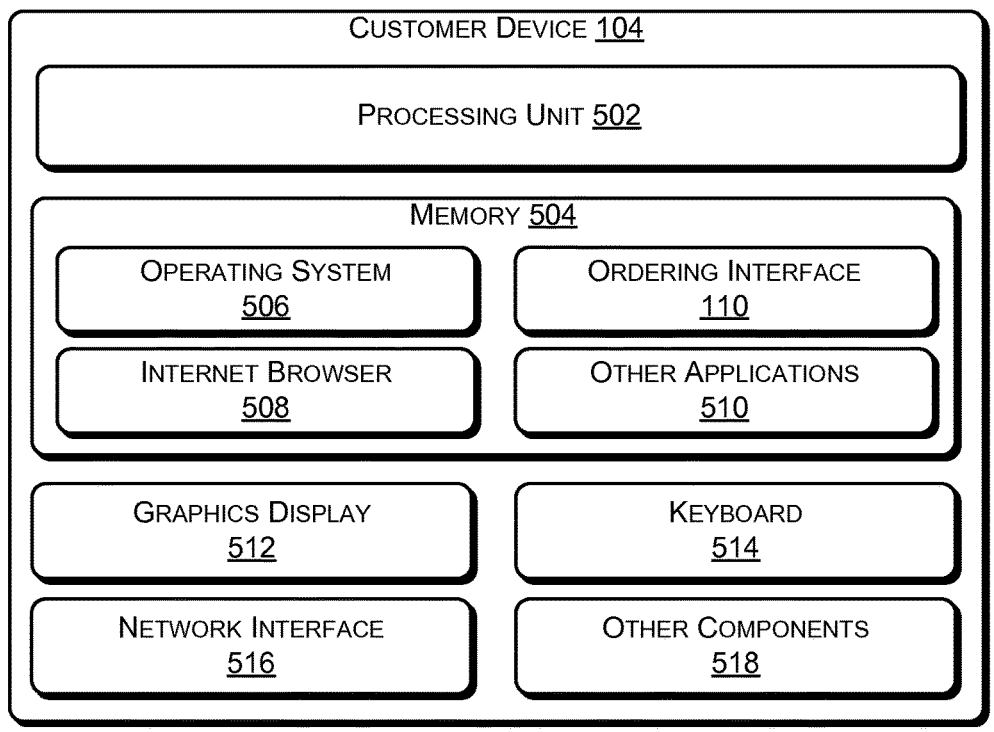
FIG. 5 is a block diagram illustrating high-level components of a customer device.

FIG. 5 illustrates relevant components of an example customer device 104 that may be used in conjunction with the system described above. The device 104 may comprise a computerized device having network or other communications capabilities. For example, the device 104 may comprise a personal computer, a tablet computer, a smartphone, a media consumption device, a gaming device, or any other type of device that is capable of generating a graphical customer interface and of accepting input from a customer.

In a very basic configuration, the example device 104 may comprise a processing unit 502 and associated memory 504. The processing unit 502 may comprise one or more processors, which may include general-purpose processors, specialized processors, processing cores, digital signal processors, etc. Depending on the configuration of the device 104, the memory 504 may be a type of computer storage media and may include volatile and nonvolatile memory. The memory 504 may include, but is not limited to, RAM, ROM, EEPROM, flash memory, or other memory technology. The memory 504 may include removable or detachable memory and may also include network-accessible memory. The memory 504 may include portable storage media such as a flash memory drive.

The memory 504 may be used to store any number of software components that are executable by the processing unit 502. In many embodiments, these software components comprise instructions or programs that are executable by the processing unit 502, and that when executed implement operational logic for performing the actions attributed above to the customer device 104.

Software components stored in the memory 504 may include an operating system 506, an Internet browser 508, and one or more application programs, which may include the ordering interface 110. Other applications 510 may include the calendar application 118, the activity monitor 120, and various other consumer applications that may be purchased or obtained from an application market and installed by the customer on the customer device 104.

Physical components of the device 104 may include a graphics display 512 and a keyboard 514 for presenting information to and receiving information from the customer.

The customer device 104 has a network interface 516 for communicating with the ordering service 102. The network interface 516 may comprise a wireless interface such as a Wi-Fi interface or a cellular data interface. The network interface 516 may allow communications with the ordering service 102 through a public wide-area network such as the Internet.

The customer device 104 may have various other physical and logical components 518, depending on the nature of the device and its intended functionality.

Figure 6:
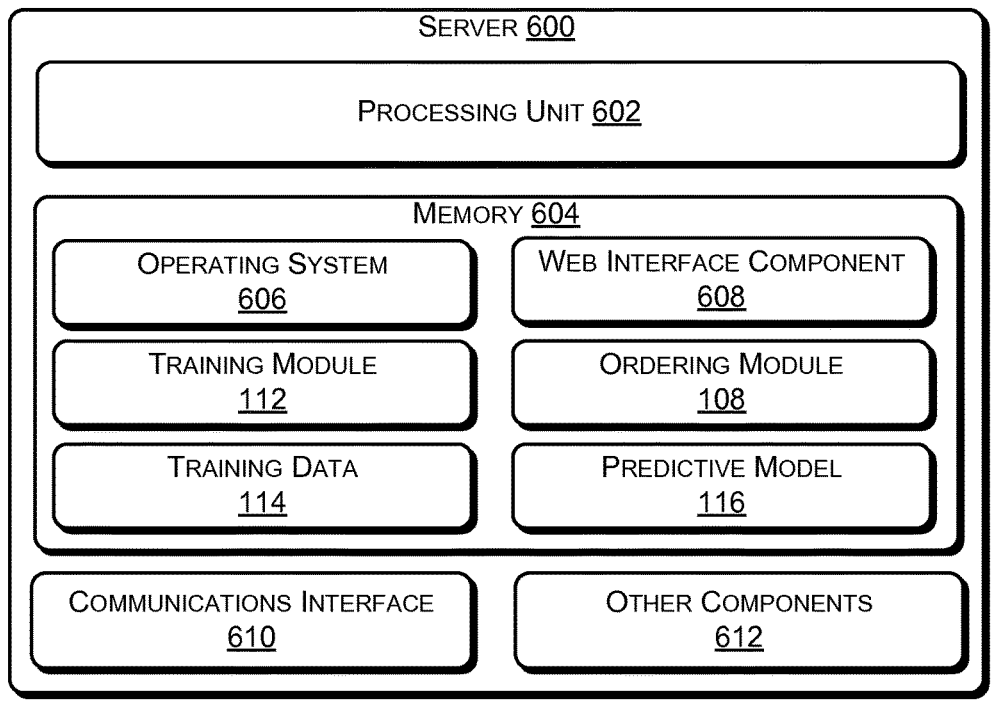
FIG. 6 is a block diagram illustrating high-level components of a computer server that may be used in part to implement a meal ordering service.

FIG. 6 illustrates relevant components of an example server 600 that may be used to implement the functionality of the ordering service 102 and/or any of its components or functional elements. Generally, the ordering service 102 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises. Furthermore, the ordering service 102 may be part of a larger infrastructure that provides various types of functions and services to multiple users, not limited to the functions and services described above.

In a very basic configuration, the example server 600 may comprise a processing unit 602 and associated memory 604. The processing unit 602 may comprise one or more processors, which may include general-purpose processors, specialized processors, processing cores, digital signal processors, etc. Depending on the configuration of the server 600, the memory 604 may be a type of computer storage media and may include volatile and nonvolatile memory. The memory 604 may include, but is not limited to, RAM, ROM, EEPROM, flash memory, or other memory technology. The memory 604 may include removable or detachable memory and may also include network-accessible memory. The memory 604 may include portable storage media such as a flash memory drive.

The memory 604 may be used to store any number of software components that are executable by the processing unit 602. In many embodiments, these software components comprise instructions or programs that are executable by the processing unit 602, and that when executed implement operational logic for performing the actions attributed above to the ordering service 102.

Software components stored in the memory 604 may include an operating system 606 and a web interface component 608 that interacts with remote devices such as computers, media consumption devices, and so forth. For example, the web interface component 608 may implement a website that is accessible using Internet browsers of customer devices.

The memory 604 may also store the training module 112, the ordering module 108, the training data 114, and the predictive model 116.

The server 600 may have a communication interface, such as an Ethernet communications interface, which provides communication by the server 600 with other servers, with the Internet, and ultimately to multiple customer devices 104.

The server 600 may of course include many other logical, programmatic, and physical components 612 that are not specifically described herein.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An automated food service ordering system, comprising:
   one or more processors;
   one or more non-transitory computer-readable media storing computer-executable instructions that, when executed on the one or more processors, cause the one or more processors to perform actions comprising:
   obtaining historical context data, wherein the historical context data indicates past statuses associated with one or more customers;
   obtaining historical menu item ordering data, wherein the historical menu item ordering data indicates past times at which the one or more customers ordered menu items from each of multiple food services;

obtaining current context data, from a personal electronic device of a customer, wherein the current context data indicates one or more current, recent, or scheduled statuses of the customer;

determining a future time for delivery of a menu item based at least in part on the historical context data, the historical menu item ordering data, and the current context data;

selecting a future food service from the multiple food services based at least in part on the historical context data, the historical menu item ordering data, and the current context data;

determining a lead time for an order for the menu item; and prior to the future time, initiating the order with the future food service by at least the lead time.

2. The automated food service ordering system of claim 1, the actions further comprising:

building a predictive model based at least in part on historical context data and historical menu item ordering data of multiple customers; and wherein determining the future time is based at least in part on the predictive model.

3. The automated food service ordering system of claim 1, wherein the lead time for the order is based at least in part on historical delivery times from the future food service.

4. The automated food service ordering system of claim 1, wherein initiating the order comprises prompting the customer to authorize the order.

5. The automated food service ordering system of claim 1, wherein initiating the order comprises placing the order without prompting the customer to authorize the order.

6. The automated food service ordering system of claim 1, wherein the current context data indicates one or more of:
calendar information of the customer;
weather information;
traffic information;
status information generated by the personal electronic device of the customer;
activity information generated by the personal electronic device of the customer;
exercise performed by the customer; or
caloric intake of the customer.

7. The automated food service ordering system of claim 1, wherein each of the past, recent, current, and scheduled statuses comprises one or more of:
a location of the customer; or
an activity of the customer.

8. The automated food service ordering system of claim 1, the actions further comprising:
obtaining historical lead times for the food service;
estimating a delivery lead time based at least in part on the historical lead times of the future food service; and
wherein initiating the order is performed at a time that is prior to the future time by at least the delivery lead time.

9. The automated food service ordering system of claim 1, the actions further comprising:
obtaining historical context data regarding multiple customers, wherein the historical context data indicates past statuses of the multiple customers;
obtaining historical menu item ordering data regarding the multiple customers, wherein the historical menu item ordering data indicates past times at which the multiple customers ordered menu items from each of the multiple food services; and
wherein determining the future time is further based at least in part on the historical context data regarding the multiple customers and the historical menu item ordering data regarding the multiple customers.

10. A method implemented by a computerized system, the method comprising:
determining a future time at which a customer will want to receive a menu item based at least in part on context information regarding the customer;
selecting a food service to provide the menu item;
determining an estimated lead time for the menu item; and
at a time prior to the future time by at least the estimated lead time, initiating an order with the food service for the menu item.

11. The method of claim 10, further comprising selecting the food service based at least in part on past menu item orders of the customer.

12. The method of claim 10, wherein the estimated lead time indicates an amount of time prior to the future time to achieve delivery by the future time.

13. The method of claim 10, further comprising determining the future time based at least in part on past menu items orders of the customer and past context information regarding the customer.

14. The method of claim 10, wherein the context information indicates a location of the customer, and weather information and traffic information based at least in part on the location of the customer.

15. The method of claim 10, wherein the context information indicates an activity of the customer.

16. The method of claim 10, further comprising determining the future time based at least in part on machine learning of past behavior of multiple customers.

17. The method of claim 10, further comprising determining the menu item based at least in part on past orders by the customer.

* * * * *